United States Patent [19]

Ross et al.

[11] Patent Number: 4,630,910

[45] Date of Patent: Dec. 23, 1986

[54] METHOD OF MEASURING IN THREE-DIMENSIONS AT HIGH SPEED

[75] Inventors: Joseph Ross, Ft. Salonga; Paul DiMatteo, Huntington, both of N.Y.

[73] Assignee: Robotic Vision Systems, Inc., Hauppauge, N.Y.

[21] Appl. No.: 580,653

[22] Filed: Feb. 16, 1984

[51] Int. Cl.[4] ............................................. G03B 29/00
[52] U.S. Cl. ..................................... 354/76; 354/77; 354/113
[58] Field of Search .................................. 354/75–80, 354/112, 113, 292, 354

[56] References Cited

U.S. PATENT DOCUMENTS

| | | | |
|---|---|---|---|
| 891,013 | 6/1908 | Smith | 354/77 |
| 1,596,458 | 8/1926 | Schiesari | 354/77 |
| 3,169,459 | 2/1965 | Friedberg et al. | 354/113 |
| 4,238,147 | 12/1980 | Stern | 354/77 |
| 4,239,359 | 12/1980 | Morioka | 354/113 |
| 4,286,852 | 9/1981 | Stern et al. | 354/77 |
| 4,370,039 | 1/1983 | Landwehr | 354/77 |

Primary Examiner—Russell E. Adams
Attorney, Agent, or Firm—Max Fogiel

[57] ABSTRACT

An apparatus with a common aperture and multiple image recording surfaces with individual filters and/or controlled shutters enables the implementation of several methods of 3-D measurement systems. The parallel nature of the device lends to short measurement times suitable for measuring moving objects. A similar apparatus may be constructed to project multiple images simultaneously or in rapid succession. Elimination of mechanical motion within the projectors and cameras of the prior art reduce the measurement time significantly. A new method of 3-D measurement employing a sweeping light plane and time encoded image recording uses the apparatus. An alternate method maintains a stationary projected light plane through which an object moves as it is measured in 3-D. Another method uses simultaneous projection of light patterns at different frequencies. Another method employs the time of flight of a light pulse and time encoded recording of the reflected energy.

8 Claims, 8 Drawing Figures

METHOD OF MEASURING IN THREE-DIMENSIONS AT HIGH SPEED

BACKGROUND OF THE INVENTION

It is desirable, in certain applications, to make three dimensional measurements at very high speed, especially with fast moving or fast shape changing objects. To make three dimensional measurements in the prior art, two methods have been used as follows:

1. A succession of patterns were projected onto the object being measured. Corresponding to each of the light patterns projected onto the object, a photograph or TV picture was taken. Both digital and analog patterns were used.
2. A succession of pulses of light were transmitted and a gated receiver integrated the light reflected from the object to be measured. The gating was done in a time-coded manner to encode distance to the object surface as a function of the travel time of the light.

Since both methods involve a sequence of events that have time durations that may accumulate to a period of time too great to make an adequate measurement, the present invention provides two methods to improve the state of the art. The limitations of the prior art come from the time it takes to change the projection of one pattern to another and the time it takes to record the reflected light and prepare for a subsequent recording.

The present invention provides methods for allowing events on both the projector and receiver sides of the measurement system to operate in parallel in order to reduce the overall time of measurement. The methods can also be applied, in part, to implement other prior art techniques such as separating the transmitted patterns by the frequency of radiation and parallel gating of received energy from a single projected pulse.

SUMMARY OF INVENTION

It is an object of the present invention to provide improved methods of projecting and receiving electromagnetic energy in order to extract three-dimensional information in a shorter period of time.

In keeping with this object, and with still others, which will become apparent as the description proceeds, one aspect of the invention resides in a method of detecting three-dimensional information comprising the steps of projecting multiple patterns of light upon the subject to be measured, one pattern at a time, and recording each reflected pattern with a separate camera.

A second aspect of the invention resides in a method of detecting three-dimensional information comprising the steps of projecting a moving plane of light upon the subject to be measured, and making multiple recordings of the reflected light with multiple cameras in a coded manner.

A third aspect of the invention resides in a method of detecting three-dimensional information comprising the steps of projecting a stationary plane of light upon a moving subject to be measured and making multiple recordings of the reflected light with multiple cameras whose views are synchronized to the subject's motion. The multiple recordings are made in a coded manner.

A fourth aspect of the invention resides in a method of detecting three-dimensional information comprising the steps of projecting multiple patterns of light simultaneously upon the subject to be measured. Each pattern is at a different wavelength, and recording each reflected pattern with a separate matching filter and camera.

A fifth aspect of the invention resides in a method of detecting three-dimensional information comprising the steps of projecting a pulse of light upon the subject to be measured and making multiple recordings of the reflected light with multiple cameras in a coded manner.

The invention will hereafter be described with reference to an exemplary embodiment, as illustrated in the drawings. However, it is to be understood that this embodiment is illustrated and described for the purpose of information only, and that nothing therein is to be considered limiting of any aspect of the invention.

BRIEF DESCRIPTION OF THE DRAWINGS

FIG. 6b shows images received by the system of FIG. 6a;

DESCRIPTION OF THE PREFERRED EMBODIMENTS

Figure 1:
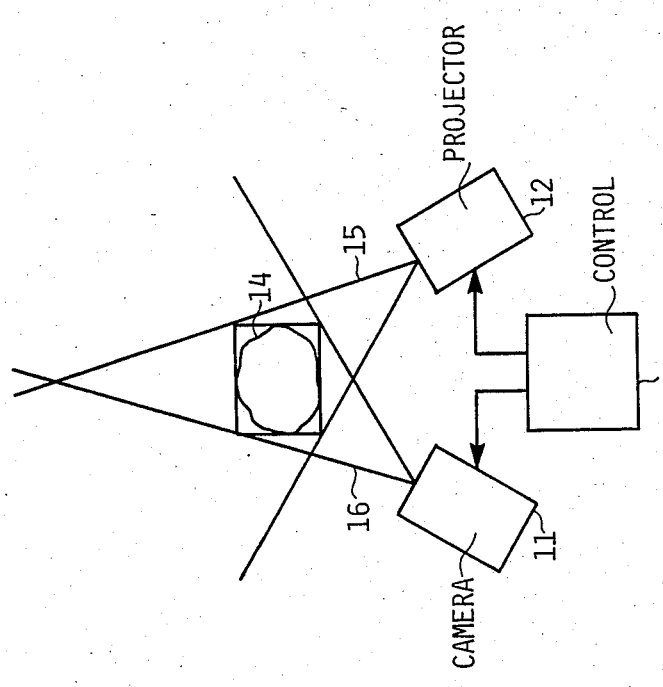
FIG. 1 shows schematically a 3-D measurement system with pattern projector, camera and synchronizing electronics.
Figure 2:
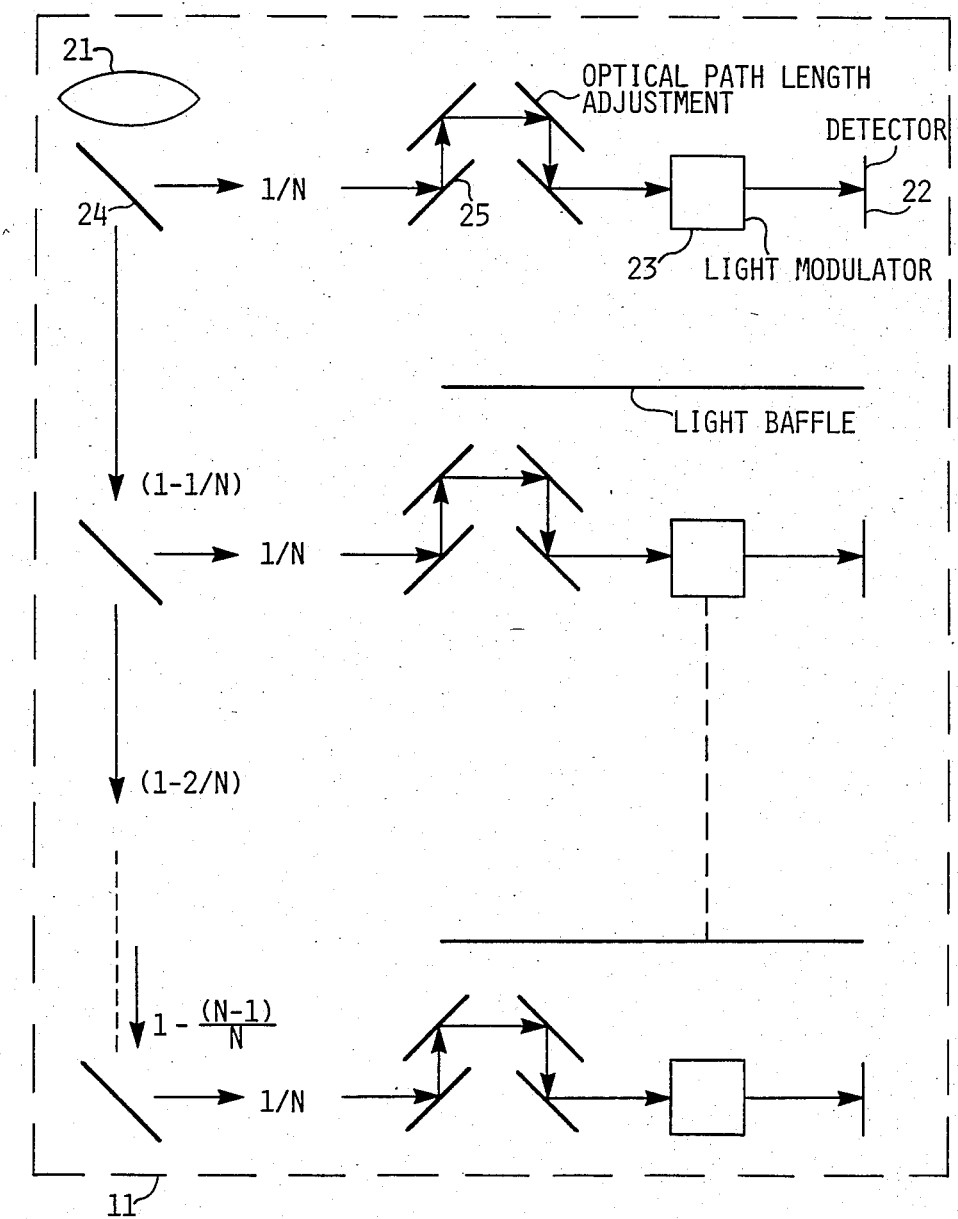
FIG. 2 shows schematically a novel method of paralleling cameras.

In FIG. 1, projector 12 illuminates subject 14 to be measured with light beam 15, causing reflected light 16 which can be recorded by camera 11. (Hereinafter the term "light" is to be understood to mean electromagnetic radiation including but not limited to, the visible spectrum.) Electronic control 13 can synchronize the camera 11 with the light projection 15. In one practice of the prior art, projector 12 emits a unique pattern of light 15 onto subject 14 and camera 11 records the reflected light 16. After a period of time sufficient for both projector 12 and camera 11 to set up for a second unique pattern, the procedure is repeated. It is not uncommon for many unique patterns to be required to obtain all the desired 3-D measurement data, so the process can take significant time. The present invention eliminates the time delay in moving film if camera 11 uses film or in reading out the recorded video image if camera 11 is a TV camera. This is accomplished as shown in FIG. 2 where it is shown that, internal to camera 11, a lens 21 can be placed, through which the reflected light is imaged onto multiple light-sensitive surfaces 22 (photographic film or light-sensitive electronic receiver such as a vidicon or a TV semiconductor chip). The light exiting lens 21 first encounters beam splitter 24 which reflects a fraction, 1/N, of the light toward light-sensitive surface 22. An optical path length adjustment 25 can be made to make a more compact design and avoid moving surface 22 for focusing. A controlled light shutter 23 (such as a Pockels cell) allows the light to reach the surface 22 only during the projection of one of the unique patterns. Similar paths split the light onto N equal intensity images on the N surfaces 22; only one path of which is not blocked by its shutter 23. Each shutter 23 only opens during its respective unique light pattern projection period. The ratio of light split at each beam splitter 24 is shown to vary as $1/N:(1-1/N)=1:N-1$ for the first, $1/N:(1-2/N)=1:N-2$ for the second ... $1/N:(1-(N-1)/N)=1:1$ for the (N−1)th and 1/N:0 (total reflection) for the Nth.

Thus the minimum time in which the sequence of the patterns can be recorded is no longer limited by the time in which a camera can store the data away and prepare for the next recording. The limit now is the time needed to record the reflected light intensity pattern and the speed of the shutter 23.

Figure 3:
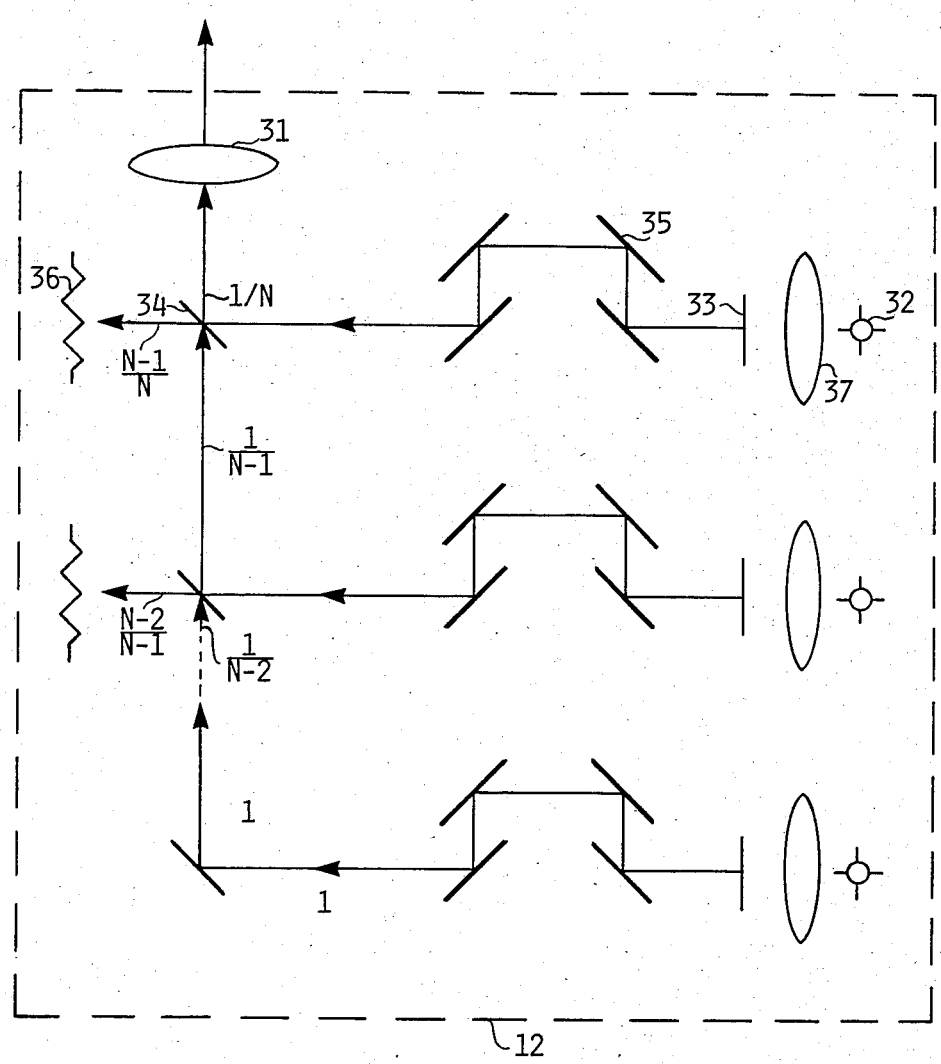
FIG. 3 shows schematically a novel method of paralleling projectors.

A similar problem may exist with projector 12 not being able to change projected patterns quickly enough. This being particularly true if mechanical means are employed to change patterns. FIG. 3 shows a means analogous to that of FIG. 2 except applied to projector 12. In each of N paths, within projector 12, a light source 32 may be placed, whose light is concentrated by lens 37 into the center of lens 31 after passing through mask 33, optical path length adjustment 35 and beam splitter 34. Lens 31 images the light passing through mask 33 onto the subject to be measured, forming the unique pattern required for 3-D measurement.

The beam splitter ratio of the first path (nearest the lens 31) is chosen to be $1/N:(1-1/N)=1:(N-1)$ with $(1-1/N)$ of the light passing through and absorbed by light trap 36. The second path (next furthest from lens 31) ratio is chosen to be $1/(N-1):(1-(1/N-1))=1:(N-2)$. Thus, $1/(N-1)\cdot(N-1)/N=1/N$ of the light of the second path also reaches lens 31. By similar proper choice of beam splitter ratios such as 1/2:1/2 for the (N−1)th path and 1:0 (total reflection) for the Nth path, each path will project 1/N of the source light on the subject. It will be noted these are the same ratios as in camera 11 of FIG. 2.

Light sources 32 can be flashed sequentially for the N unique patterns to be sequentially projected upon subject 14 and the electronic control 13 can simultaneously open corresponding shutters 23 in camera 11. Alternately, light sources 32 may be constant with a controlled shutter mechanism to release the light at the prescribed moment indicated by control 13.

Thus the minimum time in which the sequence of patterns can be projected is no longer limited by the time required to change patterns. The limit now is the time to reach the required light intensity-time product and the flash turn on/turn off or light shutter times.

Figure 6A:
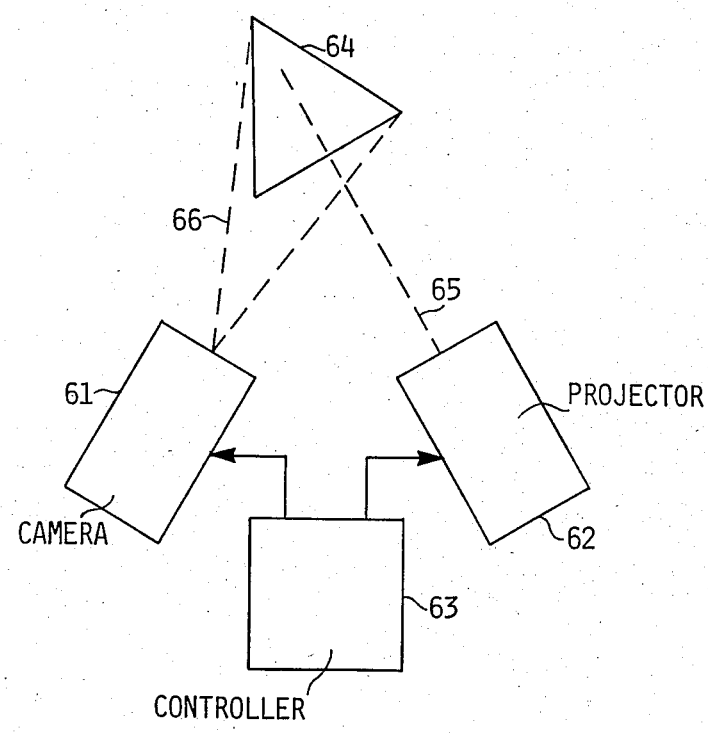
FIG. 6a shows schematically a 3-D measurement system with swept plane projector, camera and synchronizing electronics.

A second preferred embodiment of the invention, shown in FIG. 6a, allows acquiring the required information to make a 3-D measurement in the time it takes to sweep a plane of light 65 across the subject 64 at a speed that provides the required light intensity-time product of reflected light 66 to be reliably recorded by camera 61 having the same internal construction as previously described for camera 11 in FIG. 2. Shutters 23 controlled by controller 63 are opened in a time encoded manner in order to provide unique time image patterns.

Figure 6B:
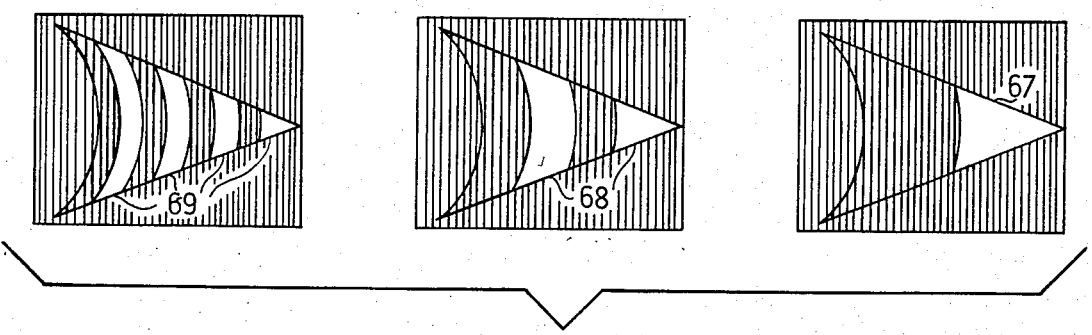

FIG. 6b illustrates the principle of the invention for a simplified case of N=3. As light plane 65 sweeps across subject 64, assumed to be a cone for this example, the first light path shutter 23 is opened for the first half of the sweep, producing an image 67 on the image recording surface 22. During the same sweep of plane 65, shutter 23 in the second light path is opened for the first and third quarters of the sweep, producing an image 68 on recording surface 22 of that light path. Likewise shutter 23 in the third light path is opened for the first, third, fifth and seventh eighths of the sweep time producing image 69 on the respective recording surface 22.

At the time of system calibration each resolvable element (pixel) on the recording surface 22 of the first path is associated with every other pixel on the other recording surfaces 22 that images the light entering the lens 21 from the same point on the subject surface. That is, each pixel of surface 22 of the first light path records light from a unique bundle of light rays entering camera 61 (11) through lens 21 and light from that bundle also images on a pixel (ideally) or cluster of four adjacent pixels on each of the other light path recording surfaces 22. These associated pixels can be used to decode the image patterns 67, 68, 69 to reveal the time and hence the plane 65 spatial position for the recorded data.

For example, if a pixel is illuminated in images 67 and 69 but not in image 68, then the third eighth time slot is indicated as the time source of the images. Since by triangulation, a bundle of rays piercing a plane of light uniquely determines the three-dimensional co-ordinates of the point of intersection, it is possible to relate the decoded image to three-dimensional position information for the inferred plane position. To resolve ambiguities arising at the transition region between the on and off regions of an image caused by the non-ideal alignment of the pixels of one surface 22 and the pixels of another surface 22, additional patterns may be recorded with transition regions not overlapping the former transition regions.

Figure 4:
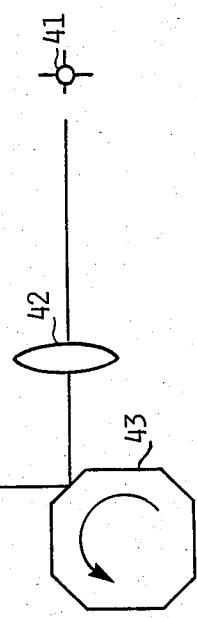
FIG. 4 shows schematically a scanning light plane projector.

The scanning plane of light can be provided by a rotating mirror apparatus as shown in FIG. 4 in which light source 41 is imaged on the subject by lens 42. The width of the light plane is then governed by the width of light source 41 and the magnification of the lens 42. Light plane 44 is caused to sweep across the subject by the action of rotating mirrors 43. Electronically generated scanning planes of light can also be used.

It is also possible to employ this method with but one light-sensitive surface 22 and N sweeps of light plane 65 which takes longer but does automatically associate the light ray bundles since the same pixel is used for each code. The accuracy is adversely affected by any error in the repeatability of the sweeps.

Figure 5:
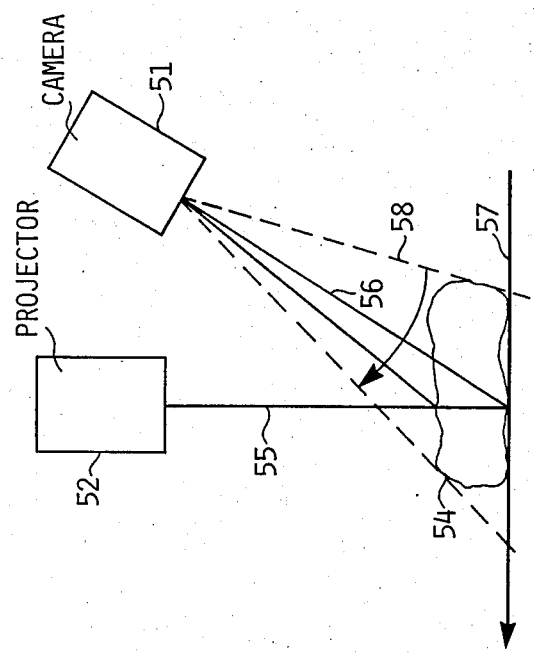
FIG. 5 shows schematically a 3-D measurement system for measuring moving objects.

A third preferred embodiment is shown in FIG. 5. Projector 52 projects a plane 55 of light onto conveyor belt 57 which transports an object 54 to be measured through plane 55. Plane 55 may be perpendicular to conveyor 57 as shown or at any arbitrary angle. Camera 51, with internal construction as given in FIG. 2, receives the reflected light 56 from the intersection of plane 55 and object 54 and records the image of the reflected light for short time intervals on each of the N light-sensitive surfaces 22 in an encoded sequence. This is the same principle as just described for FIG. 6 except that now the camera's 51 direction of view 58 is moved in synchronism with the conveyor 57 so that as object 54 passes through plane 55, the intersection of plane 55 and object 54 appears to sweep across the view of camera 51. One method of sweeping the view of camera 51 would be to employ a rotating mirror as depicted in FIG. 4, although other methods could be employed. By monitoring the speed of conveyor 57 and supplying the controlling electronics of the camera 51 sweep mechanism, the sweep can be made synchronous with the motion of object 54 and thus produce an accurate measurement of its surface.

A fourth preferred embodiment is similar to the first and can be envisioned with FIG. 1. The difference is that projector 12, possibly using the arrangement of FIG. 3, projects all N patterns simultaneously. Each pattern, however, is transmitted with a different frequency of radiation as derived from different frequency sources 32 or subsequent filtering such as by mask 33. Camera 11 with arrangement of FIG. 2 are provided, except that the N controlled light shutters 23 are replaced with N filters that only pass the frequency of radiation for the corresponding projected pattern to be recorded on the N surfaces 22. If a shutter is required, a common shutter can be placed by lens 21 to expose all paths simultaneously. This arrangement reduces the time of acquiring the 3-D measurement since all patterns are simultaneously recorded.

Figure 7:
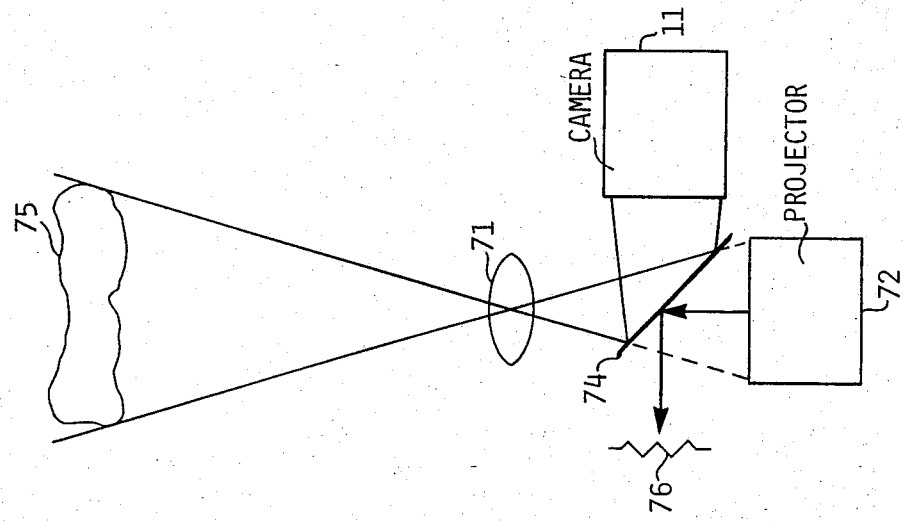
FIG. 7 illustrates an apparatus for obtaining 3-D information using the time of flight of a light pulse.

A fifth preferred embodiment employs the time of travel of light to make the 3-D measurements as in U.S. Pat. No. 4,199,253. Referring to FIG. 7, projector 72 emits a pulse of light whose time duration is no greater than the two way travel time of light across the distance of the desired depth resolution. A separate projection and receiver lens may be used or a common lens 71 as shown in FIG. 7 with beam splitter 74 allowing part of the projected light to reach the subject 75 and reflecting the rest of the light to light trap 76. Light reflected by subject 75 is imaged on light-sensitive surfaces within box 11 which is identical in construction as given in FIG. 2 with the exception that lens 21 is now external to the box in the form of lens 71. Beam splitter 74 reflects a part of the imaged light toward box 11. System losses are minimized if beam splitter 74 passes half of the incident energy and reflects the other half. Shutters 23 time encode the light reflected from subject 75 as described in U.S. Pat. No. 4,199,253. The novelty of the present invention is in providing the means for allowing the several parallel cameras required, to share a common aperture and imaging lens which provide benefits of view angle, cost, size and weight.

The invention has been described and illustrated with reference to exemplary embodiments. It is, however, not to be considered limited thereto, inasmuch as all modifications and variations which might offer themselves are intended to be encompassed within the scope of the appended claims.

What is claimed is:

1. An arrangement for recording a scene with a common aperture and multiple cameras comprising: a lens for imaging the scene on N light-sensitive surfaces; N beam splitters for dividing light from said lens into N equal intensity paths; N shutters operated by a controller, one controller being in each said path; N said light-sensitive surfaces following each said shutter; and means for independently adjusting the path length to each said light-sensitive surface; each shutter blocking incident light of its path until commanded by said controller to pass said light for the duration of a coded pattern projected during said duration.

2. An arrangement for projecting a plurality of patterns onto a common area without moving parts comprising: a plurality of light sources; each light source being imaged by a lens via separate light paths into a common light path and projection lens; the light of each said light source fully illuminating a pattern forming mask; means for independently adjusting each separate light path; a partially reflecting mirror for each separate light path for combining the separate paths into said one common path with reflecting ratios selected such that equal intensity of said light sources result in equal intensities at said projection lens; each light source providing illumination only during an interval determined by a controller; said projection lens imaging said mask patterns on a common area.

3. A method for obtaining 3-D measurements on a moving subject comprising the steps of: projecting a stationary plane of light upon said subject as said subject moves through said plane of light; synchronizing a view angle of multiple cameras to the motion of said subject; recording reflected light of said stationary plane of light from said subject with said multiple cameras via controlled shutters blocking said reflected light from said shutter's respective camera except when commanded by a controller; said controller commanding said shutters to record portions of reflected light in a time encoded sequence enabling identification of the said camera view angle and said subject location as a result of identifying the time of the recording.

4. A method for reducing the time to obtain 3-D measurements comprising the steps of: projecting a plurality of light patterns on a surface to be measured; said light patterns being projected simultaneously; each pattern being projected in a different color (frequency); and recording the reflected light from said patterns with a plurality of cameras; each camera receiving said reflected light via a filter having low attenuation for one of the said colors projected, a different color corresponding for each camera.

5. An arrangement for obtaining 3-D measurements comprising: a projector for projecting a pulse of light upon a subject and producing a scene thereof; a lens for imaging the scene on N light-sensitive surfaces; N beam splitters for dividing the light from said lens into N equal intensity paths; N shutters operated by a controller, one said shutter in each said path; N said light-sensitive surfaces following each said shutter; and means for independently adjusting the path length to each said light-sensitive surface; each shutter blocking incident light of its path until commanded by said controller; said controller commanding said shutters to record portions of the image in a time-encoded sequence enabling identification of the said light pulse location as a result of identifying the time of the recording.

6. A method for obtaining 3-D measurements comprising the steps of: sweeping a plane of light as a precise function of time across a subject to be measured; imaging the subject onto multiple light-sensitive surfaces via controlled shutters blocking said image from said shutter's respective light-sensitive surfaces except when commanded by a controller; said controller commanding said shutters to record portions of the image in a time-encoded sequence enabling identification of the said light plane location as a result of identifying the time of the recording, whereby sweeping said plane across said subject N light-sensitive surfaces behind N shutters can time-encode $2^N-1$ positions of the plane of light.

7. A method for obtaining 3-D measurements comprising the steps of: sweeping a plane of light as a precise function of time across a subject to be measured; imaging the subject onto a light-sensitive surface via a controlled shutter blocking said image from said light-sensitive surface except when commanded by a controller; said controller commanding said shutter to record portions of the image in a time-encoded sequence enabling the identification of the said light plane location as a result of identifying the time of the recording; and repeating said steps for the number of codes required to obtain a predetermined resolution, said steps being repeated N times to define $2^N-1$ positions of said sweeping plane.

8. A method for reducing the time to obtain three-dimensional measurements comprising the steps of: projecting a sequence of patterns on a surface to be measured, three-dimensional measurements being obtained uniquely by said patterns when taken as a group; and recording reflected radiation from said patterns with multiple cameras, said cameras being sequenced to record one pattern by each camera, said recording step having a minimum time dependent on time needed to record reflected light intensity patterns and speed of the camera shutter.

* * * * *